United States Patent [19]
Ashikawa et al.

[11] Patent Number: 5,178,250
[45] Date of Patent: Jan. 12, 1993

[54] ROLLER SYNCHRO MECHANISM

[75] Inventors: Noboru Ashikawa; Akihito Ohhashi; Masami Takano; Ken Mizokawa; Tetuya Komori; Naohisa Shibata, all of Saitama, Japan

[73] Assignee: Honda Giken Kogyo Kabushiki Kaisha, Tokyo, Japan

[21] Appl. No.: 685,471

[22] Filed: Apr. 12, 1991

[30] Foreign Application Priority Data

Apr. 12, 1990 [JP] Japan .................. 2-97098
Nov. 30, 1990 [JP] Japan .................. 2-336580

[51] Int. Cl.$^5$ ............................. F16H 3/10
[52] U.S. Cl. .................. 192/38; 192/48.91; 74/333; 74/339
[58] Field of Search ........... 192/38, 48.91; 74/333, 74/339

[56] References Cited

U.S. PATENT DOCUMENTS

| 3,426,874 | 2/1969 | Johnston, Jr. | 192/38 |
| 3,949,848 | 4/1976 | Fogelber | 192/38 |
| 4,111,288 | 9/1978 | Fogelberg | 192/38 |
| 4,817,451 | 4/1989 | Weismann | 192/47 X |

FOREIGN PATENT DOCUMENTS

576907 5/1933 Denmark .
1946140 3/1969 Denmark .
923987 4/1963 United Kingdom .

Primary Examiner—Leslie A. Braun
Assistant Examiner—William O. Trousdell
Attorney, Agent, or Firm—Lyon & Lyon

[57] ABSTRACT

A retainer retaining a plurality of rollers therein so as to permit their slight movement in a radial direction is disposed between cam grooves provided on the outer periphery of an inner cam secured to a rotary shaft and a roller abutment surface formed on the inner periphery of a gear relatively rotatably carried on the rotary shaft, and a dowel-admission groove is defined in a side of the retainer. A dowel provided in a sleeve can enter the dowel-admission groove. The groove is defined between the adjacent rollers retained in the retainer, or at least part of the inner cam, the rollers and the retainer are disposed in a recess made in the gear, thereby achieving a reduction in axial dimension of a roller synchro mechanism. In addition, the retainer is comprised of two components: a body portion and a cover plate, thereby facilitating their machining, and a slide contact portion is formed on the outer periphery of the body portion and is tightly fitted to the roller abutment surface of the gear, so that the retainer may be dragged by the gear, thereby providing a prompt engagement of the rotary shaft with the gear.

7 Claims, 9 Drawing Sheets

ROLLER SYNCHRO MECHANISM

BACKGROUND OF THE INVENTION

1. Field of the Invention

The field of the present invention is synchro mechanisms for use in a multi-stage type transmission, and more particularly, synchro mechanisms designed to permit an outer member such as a gear relatively rotatably carried on an input or output shaft to be brought into engagement with an inner member which rotates in unison with the shaft.

2. Description of the Prior Art

There is a conventionally known roller synchro mechanism described in U.S. Pat. No. 4,817,451.

This roller synchro mechanism has a structure in which a plurality of rollers are disposed between a roller abutment surface formed at the inner periphery of a gear relatively rotatably carried on a rotary shaft and cam grooves provided on the outer periphery of an inner cam secured to the rotary shaft, and a dowel formed on a sleeve is adapted to be engaged into and disengaged from a dowel-admission groove made in a side of a retainer which retains the rollers while permitting their slight movement in a radial direction. In a state of the dowel of the sleeve being in engagement in the dowel-admission groove in the retainer, the rollers are fitted into the cam grooves and moved radially inwardly away from the roller abutment surface formed on the gear, thereby releasing engagement between the rotary shaft and the gear. On the other hand, in a state of the dowel of the sleeve being removed from the dowel-admission groove in the retainer, the rollers are urged radially outwardly by the cam grooves to bear against the roller abutment surface, thereby causing the rotary shaft and the gear to be brought into integral engagement with each other.

However, the above prior art roller synchro mechanism has a disadvantage of an increased thickness of the retainer, resulting in an increased axial dimension of the entire roller synchro mechanism, because the dowel-admission grooves in the retainer and the roller-retaining holes are juxtaposed axially. In addition, the inner cam, the rollers and the retainer are contained in a projection formed on a side of the gear, resulting in an increased thickness of the gear. This also causes an increase in axial dimension of the entire roller synchro mechanism.

The retainer used in the above prior art roller synchro mechanism is held merely in a loosely fitted manner on the roller abutment surface of the gear and for this reason, there is a possiblity that when the dowel of the sleeve is removed from the dowel-admission groove in the retainer to effect the engagement between the gear and the rotary shaft, the gear and the retainer may slip causing a time lag until engagement is achieved. Further, roller-retaining grooves in a retainer require an extremely high accuracy in machining, but the retainer in the above prior art roller synchro mechanism is comprised of a single component and hence, has a disadvantage that machining of the roller-retaining grooves having a non-circular section is difficult and requires a high cost.

SUMMARY OF THE INVENTION

Accordingly, it is an object of the present invention to provide a roller synchro mechanism which is compact in axial dimension and shows a high responsiveness when the outer member such as a gear relatively rotatably carried on the rotary shaft and the inner member which rotates in unison with the rotary shaft are brought into engagement with each other, and which enables use of a retainer which is easy to fabricate with accuracy.

To achieve the above object, according to the present invention, there is provided a roller synchro mechanism comprising: an outer member relatively rotatably carried on a rotary shaft; an inner member which rotates in unison with the rotary shaft; a plurality of cam grooves formed on one of an inner peripheral surface of the outer member and an outer peripheral surface of the inner member; a roller abutment surface formed on the other of the inner peripheral surface of the outer member and the outer peripheral surface of the inner member; a plurality of rollers disposed between the cam grooves and the roller abutment surface; a retainer for retaining the rollers therein so as to permit a slight movement thereof in a radial direction and having a dowel-admission groove provided in a side surface of the retainer; and a sleeve relatively unrotatably and axially movably carried on the rotary shaft and having a dowel engageable into and disengageable from the dowel-admission groove, wherein by removing the dowel of the sleeve from the dowel-admission groove, the rollers are radially outwardly urged by the cam grooves and press-contacted with the roller abutment surface to integrally engage the inner and outer members with each other, wherein the dowel-admission groove in the retainer is defined between adjacent rollers retained in the retainer.

With the above construction, the dowel-admission groove in the retainer is provided between the adjacent rollers retained in the retainer and therefore, even if the retainer is formed to have a minimum thickness required only to retain the rollers, the dowel-admission groove can still be formed within a range of the thickness. This ensures that the thickness of the retainer can be smaller than that in the prior art, leading to a reduction in axial dimension of the roller synchro mechanism.

In addition, according to the present invention, there is provided a roller synchro mechanism comprising: an outer member relatively rotatably carried on a rotary shaft; an inner member which rotates in unison with the rotary shaft; a plurality of cam grooves formed on one of an inner peripheral surface of the outer member and an outer peripheral surface of the inner member; a roller abutment surface formed on the other of the inner peripheral surface of the outer member and the outer peripheral surface of the inner member; a plurality of rollers disposed between the cam grooves and the roller abutment surface; a retainer for retaining the rollers therein so as to permit a slight movement thereof in a radial direction and having a dowel-admission groove provided in a side surface of the retainer; and a sleeve relatively unrotatably and axially movably carried on said rotary shaft and having a dowel engageable into and disengageable from said dowel-admission groove, wherein by removing the dowel of the sleeve from the dowel-admission groove, the rollers are radially outwardly urged by the cam grooves and press-contacted with the roller abutment surface to integrally engage the inner and outer members with each other, wherein at least part portions of the inner member, the rollers and the retainer are disposed in a recess made in the outer member.

With the above construction, at least part of the inner member, the rollers and the retainer are disposed in the recess made in the outer member and therefore, it is not necessary to form a projection on a side of the gear for containing the inner member, the rollers and the retainer. Consequently, it is possible to make the thickness of the outer member smaller than that in the prior art, leading to a reduction in axial dimension of the roller synchro mechanism.

Further, according to the present invention, there is provided a roller synchro mechanism comprising: an outer member relatively rotatably carried on a rotary shaft; an inner member which rotates in unison with the rotary shaft; a roller abutment surface formed on an inner peripheral surface of the outer member; a plurality of cam grooves formed on an outer peripheral surface of the inner member; a plurality of rollers disposed between the cam grooves and the roller abutment surface; a retainer for retaining the rollers therein so as to permit a slight movement thereof in a radial direction and having a dowel-admission groove provided in a side surface of the retainer; and a sleeve relatively unrotatably and axially movably carried on the rotary shaft and having a dowel engageable into and disengageable from said dowel-admission groove, wherein by removing the dowel of the sleeve from the dowel-admission groove, the rollers are radially outwardly urged by the cam grooves of the inner member and press-contacted with the roller abutment surface of the outer member to integrally engage the inner and outer members with each other, wherein the retainer comprises a body portion and a cover plate, the body portion being provided with roller-retaining grooves for retaining one of end faces of an opposite sides of a peripheral surface of each of the rollers, the other end face of each roller being retained by the cover plate, and the body portion being further provided at an outer periphery thereof with a slide contact portion which is tightly fitted to the roller abutment surface of the outer member.

With the above construction, the slide contact portion is formed at the outer periphery of the retainer and tightly fitted to the roller abutment surface of the outer member and therefore, when the dowel of the sleeve is removed from the dowel-admission groove in the retainer for providing engagement between the rotary shaft and the outer member, the retainer can be dragged by the outer member under a frictional force acting between the roller abutment surface and the slide contact portion. This ensures that the retainer dragged by the outer member and the inner member provided on the rotary shaft can be rotated relative to each other without any time lag, and the rollers can be urged radially outwardly by the inner member, thereby bringing the rotary shaft and the outer member promptly into engagement with each other.

In addition, since the retainer comprises two components: the body portion having the roller-retaining grooves; and the cover plate coupled to the body portion to cover the opening on one side of each of the roller-retaining grooves, machining of the grooves is facilitated, which enables an improvement in machining accuracy and a reduction in manufacturing cost.

The above and other objects, features and advantages of the invention will become apparent from reading of the following description of the preferred embodiments, taken in conjunction with the accompanying drawings.

BRIEF DESCRIPTION OF THE DRAWINGS

FIGS. 1 to 4 illustrate a first embodiment of the present invention, wherein

FIGS. 6 to 8 illustrate a third embodiment of the present invention, wherein

DESCRIPTION OF THE PREFERRED EMBODIMENTS

The present invention will now be described by way of embodiments in connection with the accompanying drawings.

Figure 1:
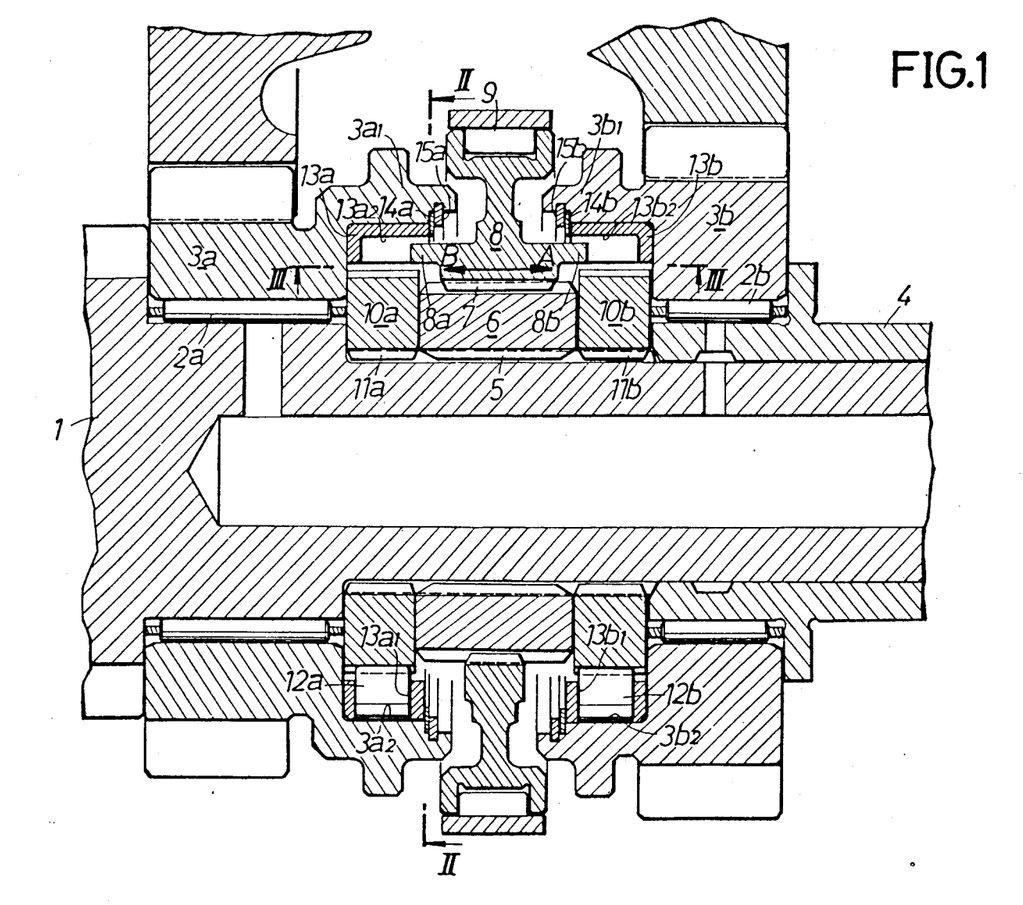
FIG. 1 is a sectional view of a roller synchro mechanism of the first embodiment, taken along a line I—I in FIG. 2.

Referring to FIG. 1, a first shift-stage gear $3a$ as an outer member is relatively rotatably carried through a needle bearing $2a$ on a rotary shaft 1 constituting an input shaft of a multi-stage type transmission, and a second shift-stage gear $3b$ as another outer member is also relatively rotatably carried likewise through a needle bearing $2b$ on a collar 4 fitted over the rotary shaft 1 at a location axially spaced from the gear $3a$ by a predetermined distance. Between the gears $3a$ and $3b$, a sleeve 8 is axially slidably carried through a spline 7 around an outer periphery of a boss 6 which is connected to the rotary shaft 1 through spline 5, so that the axial movement of the sleeve 8 by a shift fork 9 causes the first shift-stage gear $3a$ or the second shift-stage gear $3b$ to be brought into integral engagement with the rotary shaft 1, thereby establishing a first or second shift stage.

Figure 2:
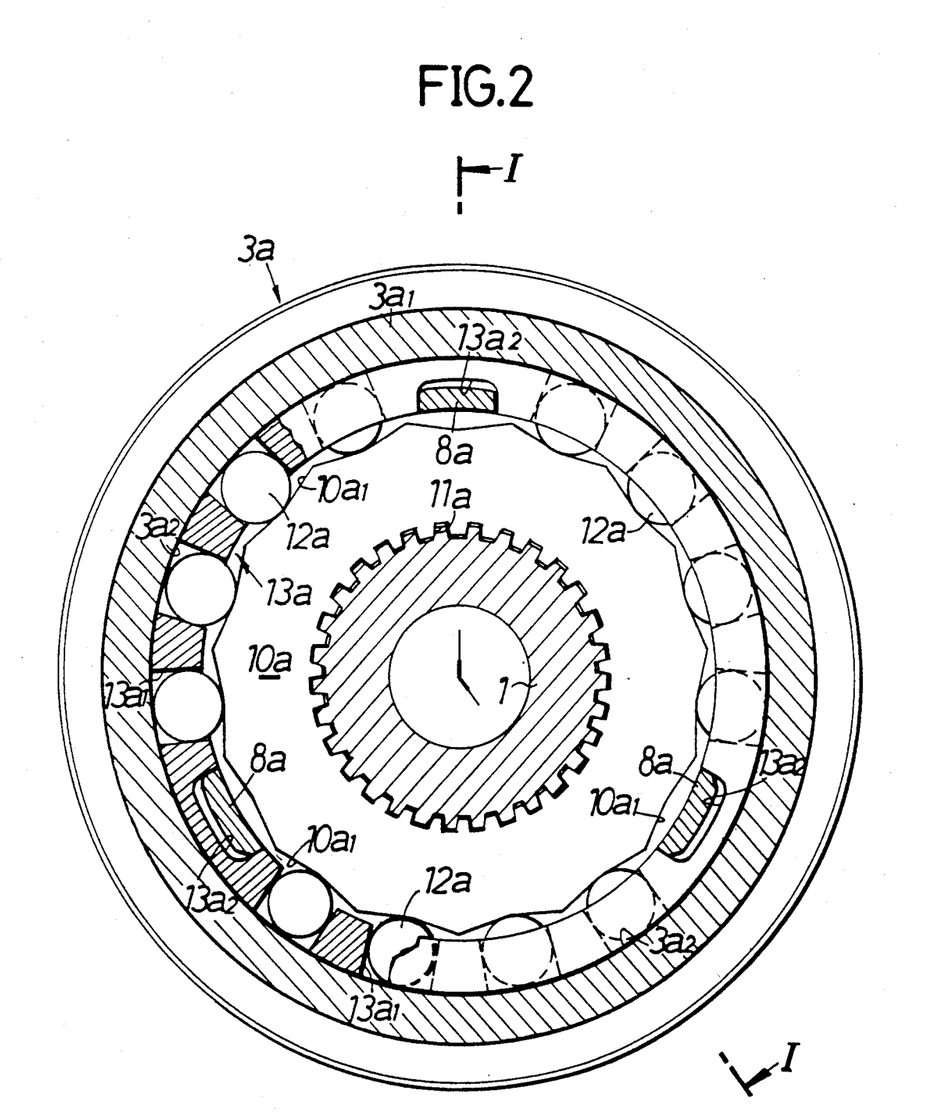
FIG. 2 is a sectional view taken along a line II—II in FIG. 1.

As can be seen from FIGS. 1 and 2, a ring-shaped inner cam $10a$ is secured to the rotary shaft 1 through a spline $11a$ between the first shift-stage gear $3a$ and the boss 6, and a large number of angle cam grooves $10a_1$ are provided on the outer periphery of the inner cam $10a$ as an inner member. A plurality of rollers $12a$ are disposed between the cam grooves $10a_1$ of the inner cam $10a$ and a roller-abutment surface $3a_2$ formed on the inner periphery of a projection $3a_1$ provided on one side surface of the gear $3a$, respectively.

Figure 3:
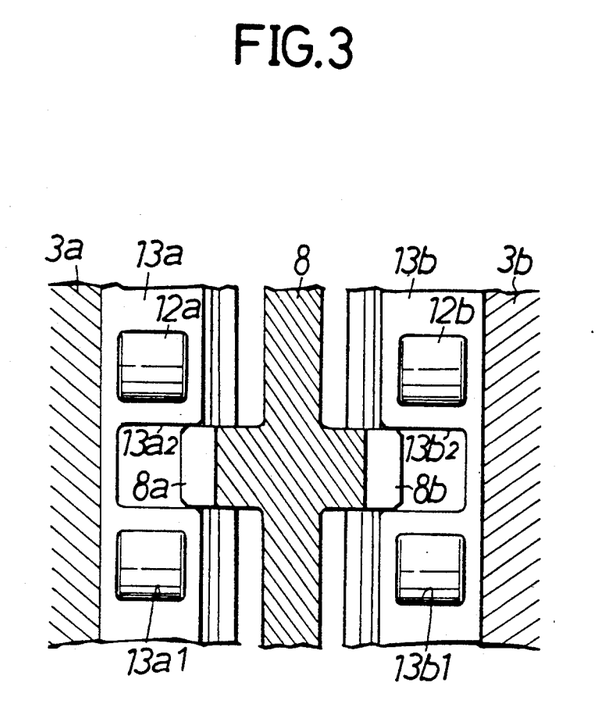
FIG. 3 is a sectional view taken along a line III—III in FIG. 1.
Figure 4:
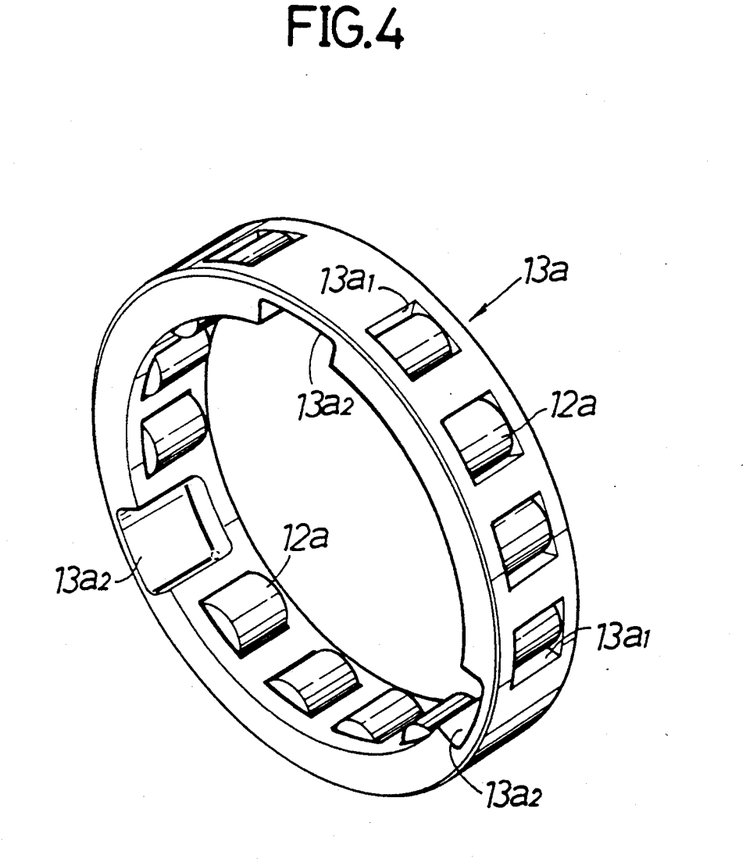
FIG. 4 is a perspective view of a retainer.

It can be seen from reference to FIGS. 3 and 4 together with FIGS. 1 and 2 that a ring-shaped retainer $13a$ is fitted between the inner cam $10a$ and the projection $3a_1$ of the gear $3a$, with an outer periphery of the retainer $13a$ placed into slide contact with the roller-abutment surface $3a_2$ of the gear $3a$ for permitting relatively rotating movement therebetween, and is prevented by a clip $15a$ through a control ring $14a$ from being slipped out. The retainer $13a$ is provided with a plurality of roller-supporting holes $13a_1$ extending radially therethrough in correspondence with positions of the cam grooves $10a_1$, and the rollers $12a$ are retained within the roller-supporting holes $13a_1$ so as to be permitted a slight movement in a radial direction. Three dowel-admission grooves are provided at the inner periphery of the retainer $13a$ at equal angles of 120° and opened to one side surface of the retainer $13a$ to extend axially. As best shown in FIG. 3, the dowel-admission grooves $13a_2$ are made to lie intermediate adjacent roller-supporting holes $13a_1$, thereby ensuring that the axial thickness of the retainer $13a$ is of a minimum level required for retaining the rollers $12a$.

A dowel $8a$ is projectingly provided on one side of the sleeve 8, so that it is removed from the dowel-admission groove $13a_2$ by the axial movement of the sleeve 8 through the spline 7. When the dowel $8a$ is in engagement with the dowel-admission groove $13a_2$, the inner cam $10a$ and the retainer $13a$ are positioned in the state shown in FIG. 2, and each of the rollers $12a$ is fitted in the middle of the cam groove $10a_1$.

A roller synchro mechanism for the second shift stage has a structure substantially symmetrical with and identical to a roller synchro mechanism for any first shift stage and hence, the duplicated description thereof will be omitted here by using reference numerals and characters with a suffix b attached thereto.

Description will now be made of the operation of the first embodiment of the present invention having the above-described construction.

In a condition in which the sleeve 8 is in a neutral position shown in FIG. 1 with the dowel $8a$ thereof fitted in the dowel-admission groove $13a_2$ of the retainer $13a$ on the side of the gear $3a$, the inner cam $10a$ and the retainer $13a$ are positioned in the state shown in FIG. 2 through the spline $11a$, the rotary shaft 1, the spline 5, the boss 6, the spline 7, the dowel $8a$ of the sleeve 8, and the dowel-admission groove $13a_2$. In this condition, the roller $12a$ is retained in the retainer $13a$ at a position slightly moved radially inwardly within the roller-supporting hole $13a_1$ away from the roller abutment surface $3a_2$ of the gear $3a$. In this state, the outer peripheral surface of the retainer $13a$ and the roller abutment surface $3a_2$ are slipped relative to each other, so that the transmission of torque between the rotary shaft 1 and the gear $3a$ is cut off. At this time, the dowel $8a$ of the sleeve 8 is also fitted in the dowel-admission groove $13b_2$ of the retainer $13b$ on the side of the gear $3b$, so that the transmission of a torque between the rotary shaft 1 and the gear $3b$ is also cut off.

If the sleeve 8 is moved from this state in the direction of an arrow A, thereby removing the dowel $8a$ from the dowel-admission groove $13a_2$, the retainer $13a$ and the inner cam $10a$ can then be relatively rotated slightly by a torque applied from the rotary shaft 1 or the gear $3a$. And the rollers $12a$ are strongly urged radially outwardly within the roller-supporting holes $13a_1$ by the cam grooves $10a_1$ of the inner cam $10a$ to come in abutment against the roller abutment surface $3a_2$ of the gear $3a$. This causes the inner cam $10a$ and the gear $3a$, and thus the rotary shaft 1 and the gear $3a$ to be brought into integral engagement with each other, thereby establishing the first shift stage. Conversely, if the sleeve 8 is moved in the direction of an arrow B, the rotary shaft 1 and the gear $3b$ are brought into integral engagement with each other by an action similar to that described above, thereby establishing the second shift stage.

Figure 9:
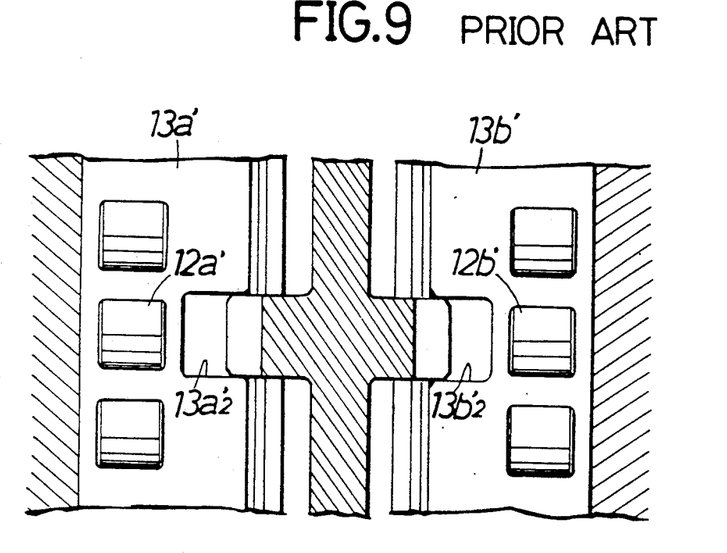
FIG. 9 is a sectional view similar to FIG. 3, but illustrating the prior art.

As apparent from comparison of FIG. 3 with FIG. 9 (prior art), dowel-admission grooves $13a_2'$ and $13b_2'$ of retainers $13a'$ and $13b'$ in the prior art are provided on axes of rollers $12a'$ and $12b'$, respectively, at axial spacings therebetween whereas the dowel-admission grooves $13a_2$ and $13b_2$ in the above embodiment are provided between the circumferentially adjacent roller-supporting holes $13a_1$ and $13b_1$, respectively. Therefore, it is possible to minimize the axial thickness of the retainers $13a$ and $13b$, resulting in a reduction in size of the roller synchro mechanism.

In the above described first embodiment, the roller abutment surfaces $3a_2$ and $3b_2$ are formed on the side of the gears $3a$ and $3b$, whereas the cam grooves $10a_1$ and $10b_1$ are formed on the side of the inner cams $10a$ and $10b$. However, it is possible to reverse this positional relationship.

Figure 5:
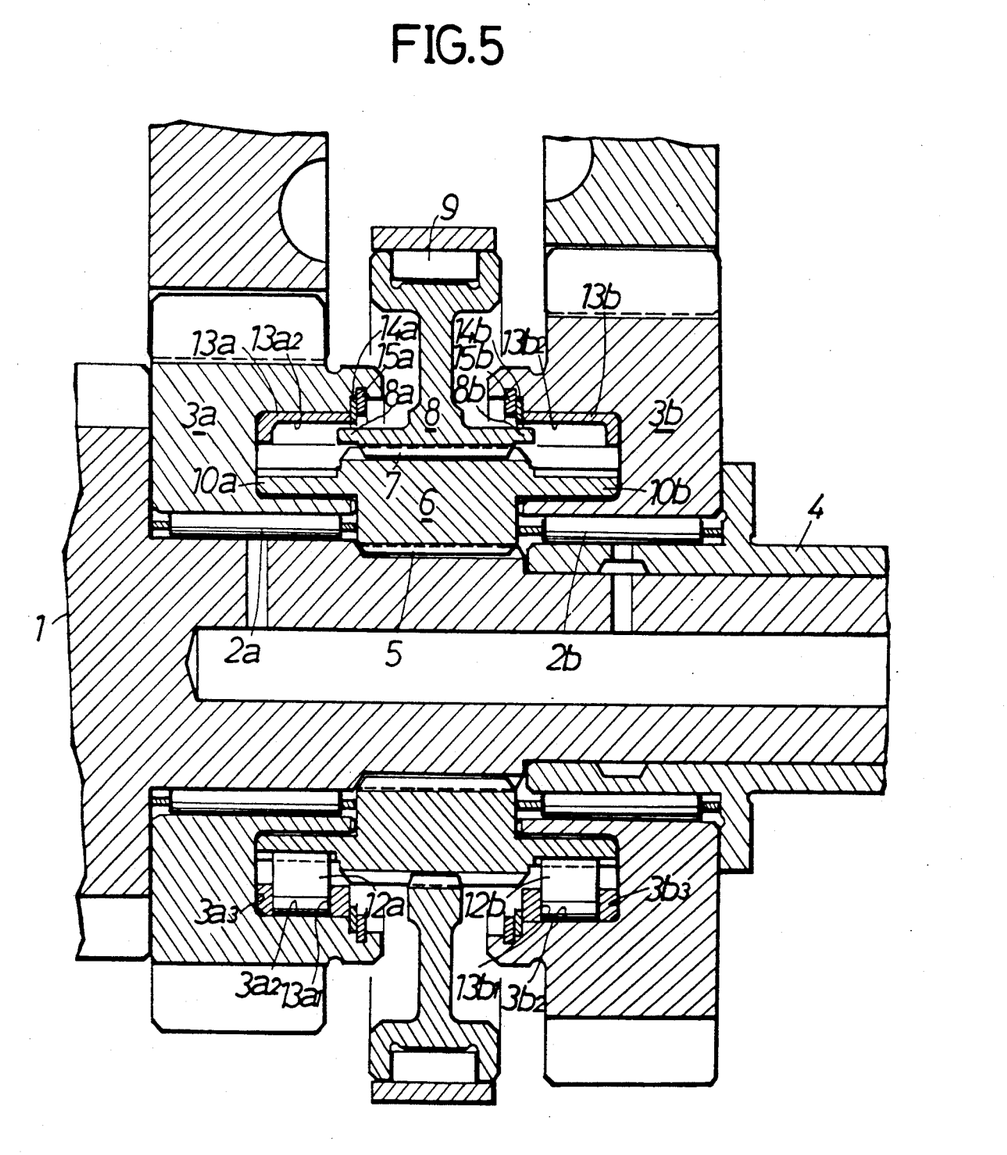
FIG. 5 is a sectional view similar to FIG. 1, but illustrating a second embodiment of the present invention.

A second embodiment of the present invention will now be described in connection with FIG. 5.

Gears $3a$ and $3b$ in this embodiment have annular recesses $3a_3$ and $3b_3$ made in opposed side surfaces thereof, respectively, and inner cams $10a$ and $10b$ and retainers $13a$ and $13b$ retaining rollers $12a$ and $12b$ are contained within the recesses $3a_3$ and $3b_3$ made in the gears $3a$ and $3b$, respectively. In this case, the inner cams $10a$ and $10b$ are formed integrally with the boss 6, because they cannot be spline-connected directly to the rotary shaft 1.

In this embodiment, the gear $3a$ or $3b$ of a first or second shift stage can be selectively brought into engagement with the rotary shaft 1 by moving the sleeve 8 axially to remove dowels $8a$ or $8b$ from dowel-admission grooves $13a_2$ or $13b_2$ of the retainers $13a$ or $13b$, respectively. As apparent from comparison of FIG. 1 with FIG. 5, in this second embodiment, the inner cams $10a$ and $10b$ and the retainers $13a$ and $13b$ retaining the rollers $12a$ and $12b$ are contained in the recesses $3a_3$ and $3b_3$ made in the gears $3a$ and $3b$, respectively and therefore, it is possible to substantially reduce the axial thickness of the gears $3a$ and $3b$ to further reduce the axial dimension of the roller synchro mechanism in cooperation with the disposition of the dowel-admission grooves $13a_2$, $13b_2$ between the adjacent rollers $12a$, $12b$.

A third embodiment of the present invention will now be described in connection with FIGS. 6 to 8.

Figure 6:
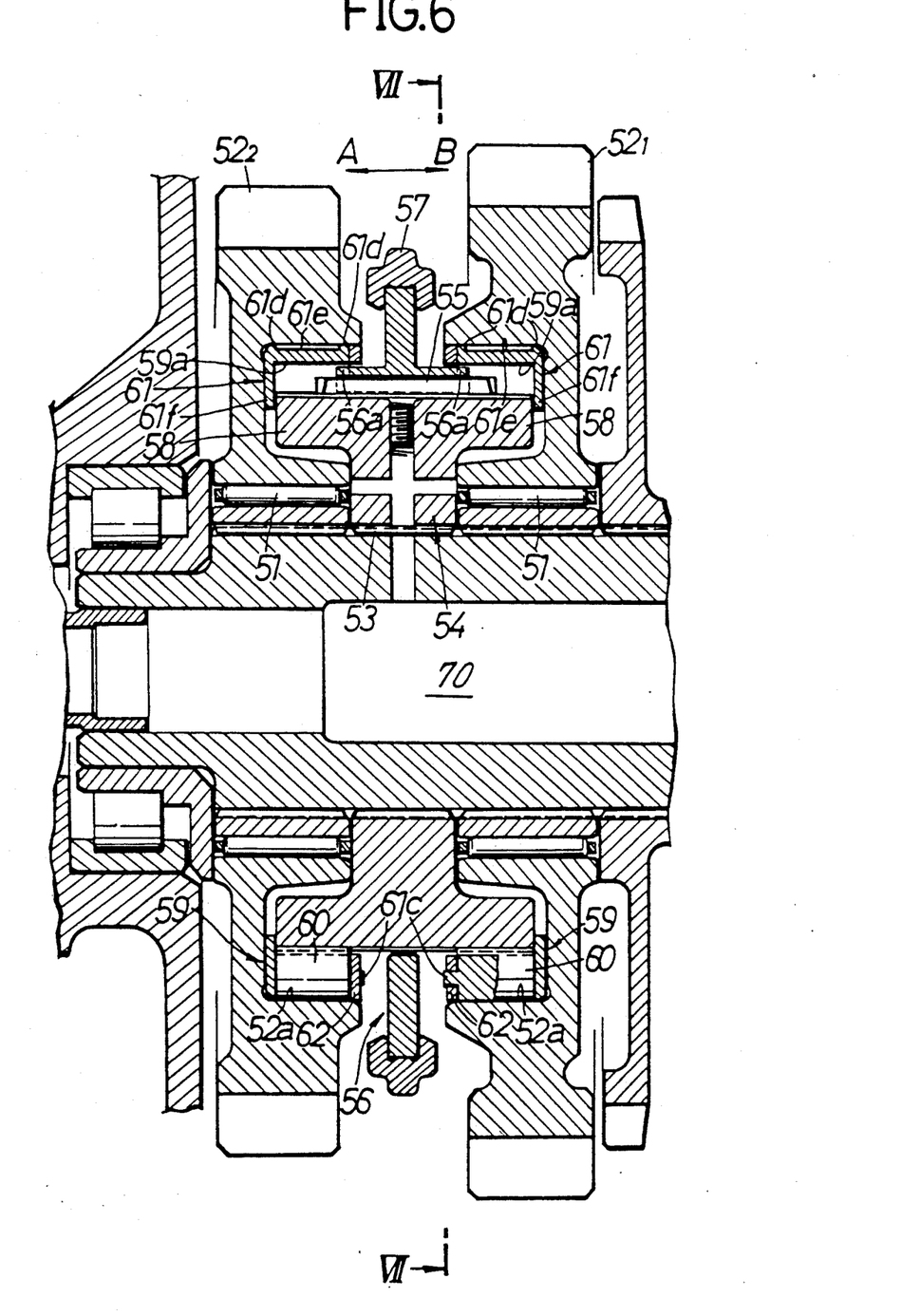
FIG. 6 is a sectional view similar to FIG. 1.

Referring to FIG. 6, a first shift-stage gear $52_1$ is relatively rotatably carried through a needle bearing 51 on a rotary shaft 70 which constitutes an output shaft of a continuously variable transmission, and a second shift-stage gear $52_2$ is also relatively rotatably carried likewise through the needle bearing 51 on the rotary shaft 70 at a location axially spaced from the gear $52_1$ by a predetermined distance. Between the two gears $52_1$ and $52_2$, a sleeve 56 is axially slidably carried through a spline 55 around an outer periphery of a boss 54 which is connected to the rotary shaft 70 through spline 53, so that the axial movement of the sleeve 56 by a shift fork 57 causes the first shift-stage gear $52_1$ or the second shift-stage gear $52_2$ to be brought into integral engagement with the rotary shaft 70, thereby selectively establishing a first or second shift stage. It should be noted that the spline 55 and the sleeve 56 are engaged in a concavo-convex fashion with each other, but this concavo-convex engagement can be reversed.

Figure 7:
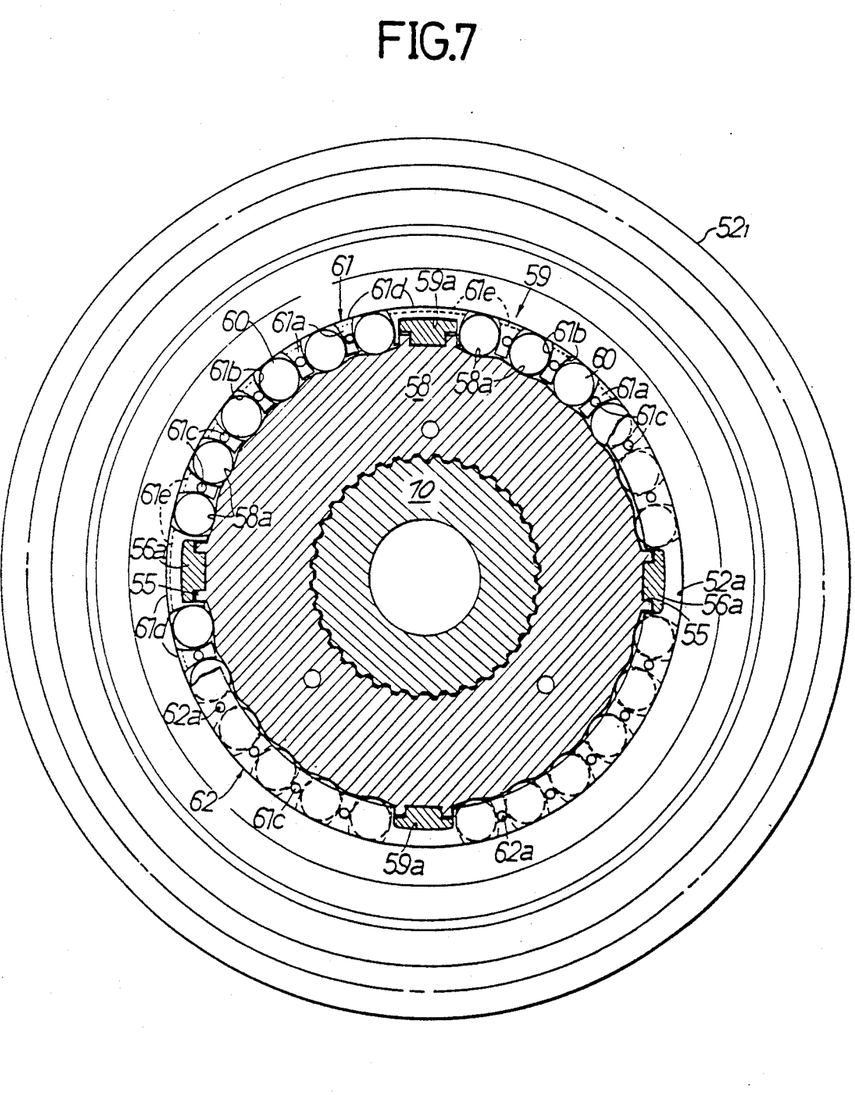
FIG. 7 is a sectional view taken along a line VII—VII in FIG. 6.

It can be seen from FIG. 7 together with FIG. 6 that a recess is made in a side surface of the first shift-stage gear $52_1$, and a ring-shaped inner cam 58 is integrally formed on a side of the boss 54 to lie within the recess. A large number of triangular cam grooves $58a$ are provided on an outer periphery of the inner cam 58, and a large number of rollers 60 retained in a retainer 59 are disposed between the cam grooves 58a and a roller abutment surface 52a formed on the outer radially inwardly directed surface of the recess in the gear $52_1$, respectively.

Figure 8:
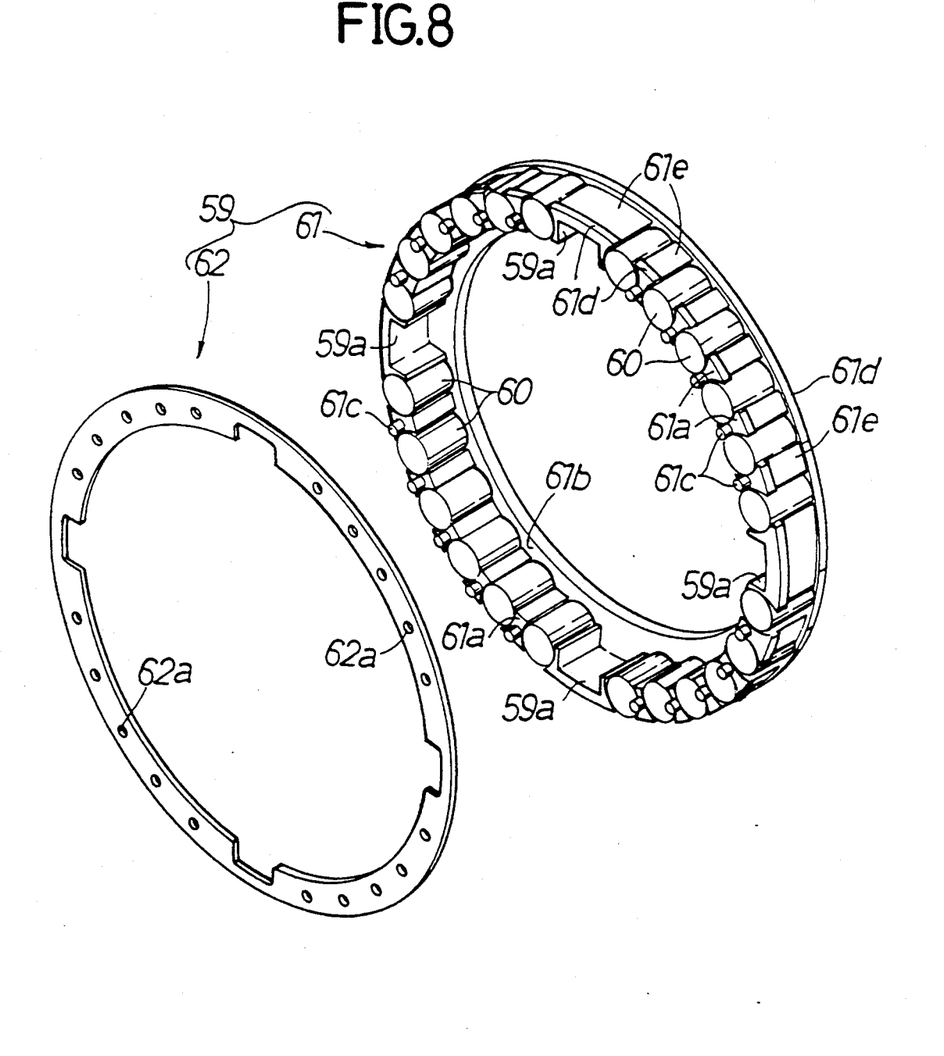
FIG. 8 is an exploded perspective view of a retainer.

As can be seen from FIG. 8 as well as from FIGS. 6 and 7, the retainer 59 is a ring-shaped member relatively rotatably fitted in the recess in the gear $52_1$ and comprised of two components: a body portion 61 and a cover plate 62. The body portion 61 is provided with roller-retaining grooves 61b defined between a large number of connections 61a to retain the rollers 60 such that the rollers 60 are permitted a slight movement in a radial direction. An inner surface of each of the roller-retaining grooves 61b, i.e., a surface opposed to the outer periphery of the roller 60 is formed into an arcuate surface having a radius of curvature larger than the radius of the roller 60, thereby making the angle of the corner defined between the roller abutment surface 52a and the roller-retaining groove 61b obtuse. A projection 61c is formed on a side of the connection 61a, and the body portion 61 and the cover plate 62 are integrally coupled to each other by fitting each of the projections 61c in a caulking manner into corresponding one of holes 62a provided in the cover plate 62. Four dowel-admission grooves 59a are provided on the inner periphery of the retainer 59 at equal angles of 90° and opened to a side thereof closer to the cover plate 62 to extend axially. By forming the roller-retaining groove 61b to have an arcuate surface as described above, there is no possibility that rollers fitted in the roller-retaining grooves 61b may fall to the outside during assembly, and therefore, the assembling efficiency of the retainer 59 can be substantially improved. Moreover, because the roller-retaining grooves 61b of the body portion 61, which require much working accuracy, are opened to the surface joined to the cover plate 62, machining of the roller-retaining grooves 61b can be easily carried out with much accuracy.

The retainer 59 is mounted between the roller abutment surface 52a of the recess in the gear $52_1$ and the cam grooves 58a of the inner cam 58 and in this case, slide contact portions 61d are formed around the outer periphery of the body portion 61 of the retainer 59 and tightly fitted into the recess in the gear $52_1$ in order to ensure that a proper frictional force is provided between the slide contact portions 61d and the recess in the gear $52_1$ to cause the retainer 59 to be dragged by the gear $52_1$ for integral rotation. In addition, lubricating grooves 61e are provided on the outer periphery of the body portion 61 of the retainer 59, and a locking portion 61f (see FIG. 6) is formed on the body portion 61 to abut against the side surface of the inner cam 58 in order to restrain axial movement of the body portion 61.

On the other hand, four dowels 56a are projectingly provided on a side surface of the sleeve 56 at equal angles of 90°, so that an axial movement of the sleeve 56 through the spline 55 causes the dowel 56a to be brought into and out of engagement with the dowel-admission groove 59a. Thus, when the dowel 56a is in engagement with the dowel-admission groove 59a, the inner cam 58 and the retainer 59 are positioned in the state shown in FIG. 7, with each roller 60 being centrally fitted in the cam groove 58a.

According to the roller synchro mechanism of this embodiment, in a condition in which the sleeve 56 is in a neutral position shown in FIG. 6 with the right dowel 56a thereof fitted in the dowel-admission groove 59a of the retainer 59 on the side of the gear $52_1$, the inner cam 58 and the retainer 59 are positioned in the state shown in FIG. 7. Consequently, the rollers 60 retained in the retainer 59 assume the state capable of moving in the radial direction within the roller-retaining grooves 61b. In such condition, the outer peripheral surface of the retainer 59 and the roller abutment surface 52a of the gear $52_1$ are slipped relative to each other, so that the transmission of torque between the rotary shaft 1 and the gear $52_1$ is cut off. In this state the left dowel 56a of the sleeve 56 is also fitted in the dowel-admission groove 59a in the retainer 59 for the second shift-stage gear $52_2$, so that the transmission of torque between the rotary shaft 70 and the gear $52_2$ is also cut off.

If the sleeve 56 is moved from this condition in the direction of an arrow A by a shift fork 57 to remove the dowel 56a from the dowel-admission groove 59a of the gear $52_1$, the retainer 59 and the inner cam 58 for the gear $52_1$ are relatively rotated slightly by torque applied from the rotary shaft 70 or the gear $52_1$, causing the rollers 60 to be strongly urged radially outwardly within the roller-retaining grooves 61b by the cam grooves 58a of the inner cam 58 to bear against the roller abutment surface 52a of the gear $52_1$. This causes an integral engagement between the inner cam 58 and the gear $52_1$ and thus between the rotary shaft 70 and the gear $52_1$ to establish a first shift stage. Conversely, if the sleeve 56 is moved in the direction of an arrow B, the rotary shaft 70 and the gear $52_2$ are brought into integral engagement with each other by an action similar to that described above to establish a second shift stage.

In order to provide an enhanced possibility of removing the dowel 56a of the sleeve 56 from the dowel-admission groove 59a in the retainer 59 to bring the gear $52_1$ into engagement with the rotary shaft 70, it is necessary to relatively rotate the retainer 59 relative to the inner cam 58 to promptly urge the rollers 60 radially outwardly by the cam grooves 58a of the inner cam 58. To this end, the slide contact portions 61d are provided in the body portion 61 of the retainer 59 to come into close contact with the recess in the gear $52_1$ in order to allow for the dragging of the retainer 59 by the gear $52_1$ due to frictional force acting on the portions 61d to provide a prompt engagement of the gear $52_1$ with the rotary shaft 70.

When inserting the dowel 56a of the sleeve 56 into the dowel-admission groove 59a of the retainer 59 to release the engagement of the gear $52_1$ with the rotary shaft 70, it is not feared that the roller 60 may cut into a wedge-shaped corner formed by the roller-retaining groove 61b in the retainer 59 and the roller abutment surface 52a, because the roller-retaining groove 61b in the body portion 61 of the retainer 59 is formed to have an arcuate surface of a radius of curvature larger than the radius of the roller 60. Therefore, as soon as the dowel 56a is inserted, the rollers 60 become freely movable within the roller-retaining grooves 61b, so that the disengagement of the gear 52 from the rotary shaft 70 can be quickly conducted without any time lag.

While the embodiments of the present invention have been described, it will be understood that the present invention is not limited thereto, and various minor modifications can be made without departing from the scope of the present invention defined in claims.

For example, although the roller synchro mechanism has been provided between the first and second shift stages in the embodiments, it can be, of course, provided for other shift stages. In addition, although the dowel-admission groove 13$a_2$, 13$b_2$, in the second embodiment, has been made between the rollers 12$a$, 12$b$ of the retainer 13$a$, 13$b$ as in the first embodiment, such dowel-admission groove 13$a_2$, 13$b_2$ may be made on an axis of the roller 12$a$, 12$b$ as in the prior art, and the inner cam 10$a$, 10$b$, the rollers 12$a$, 12$b$ and the retainer 13$a$, 13$b$ may be disposed in the recess 3$a_3$, 3$b_3$ made in the gear 3$a$, 3$b$. Such a measure also makes it possible to provide a reduction in axial dimension of the roller synchro mechanism.

What is claimed is:

1. A roller synchro mechanism comprising:
   an outer member relatively rotatably carried on a rotary shaft;
   an inner member which rotates in unison with the rotary shaft;
   a plurality of cam grooves formed on one of an inner peripheral surface of the outer member and an outer peripheral surface of the inner member;
   a roller abutment surface formed on the other of the inner peripheral surface of the outer member and the outer peripheral surface of the inner member;
   a plurality of rollers disposed between the cam grooves and the roller abutment surface;
   a retainer for retaining the rollers therein so as to permit a slight movement of the rollers in a radial direction, the retainer having a dowel-admission groove provided in a side surface thereof; and
   a sleeve relatively unrotatably and axially movably carried on said rotary shaft and having a dowel engageable into and disengageable from said dowel-admission groove, wherein by removing the dowel of the sleeve from the dowel-admission groove, the rollers are radially urged by the cam grooves and press-contacted with the roller abutment surface to integrally engage the inner and outer members with each other, wherein
   the dowel-admission groove in said retainer is defined between adjacent rollers retained in the retainer.

2. A roller synchro mechanism comprising:
   a gear relatively rotatably carried on a rotary shaft and having gear teeth on an outer periphery thereof;
   an inner member which rotates in unison with the rotary shaft;
   a plurality of cam grooves formed on one of an inner peripheral surface of the gear and an outer peripheral surface of the inner member;
   a roller abutment surface formed on the other of the inner peripheral surface of the gear and the outer peripheral surface of the inner member;
   a plurality of rollers disposed between the cam grooves and the roller abutment surface;
   a retainer for retaining the rollers therein so as to permit a slight movement of the rollers in a radial direction, the retainer having a dowel-admission groove provided in a side surface of the retainer; and
   a sleeve relatively unrotatably and axially movably carried on said rotary shaft and having a dowel engageable into and disengageable from said dowel-admission groove, wherein by removing the dowel of the sleeve from the dowel-admission groove, the rollers are radially urged by the cam grooves and press-contacted with the roller abutment surface to integrally engage the inner member and outer members with each other, wherein at least part of said inner member, said rollers and said retainer are disposed in a recess which is made in said gear at a location radially under said gear teeth.

3. The mechanism according to claim 2, wherein said gear, comprises a pair of gears on the rotary shaft, and said recess is formed as an annular groove provided on each of mutually opposed side faces of said pair of gears, said sleeve being capable of selectively and alternatively moving toward either of the recesses.

4. The mechanism according to claim 3, wherein the inner member associated with one of the gears and the inner member associated with the other of the gears are formed integrally with each other and these inner members respectively, project into the recesses associated therewith.

5. A roller synchro mechanism comprising:
   an outer member relatively rotatably carried on a rotary shaft;
   an inner member which rotates in unison with the rotary shaft;
   a roller abutment surface formed on an inner peripheral surface of the outer member;
   a plurality of cam grooves formed on an outer peripheral surface of the inner member;
   a plurality of rollers disposed between the cam grooves and the roller abutment surface;
   a retainer for retaining the rollers therein so as to permit a slight movement of the rollers in a radial direction and having a dowel-admission groove provided in a side surface of the retainer; and
   a sleeve relatively unrotatably and axially movably carried on said rotary shaft and having a dowel engageable into and disengageable from said dowel-admission groove, wherein by removing the dowel of the sleeve from the dowel-admission groove, the rollers are radially outwardly urged by the cam grooves of the inner member and press-contacted with the roller abutment surface of the outer member to integrally engage the inner and outer members with each other, wherein
   said retainer comprises a body portion and a detachable cover plate, said body portion being provided with roller-retaining grooves for retaining one of end faces of and opposite sides of a peripheral surface of each of said rollers, the other end face of each roller being retained by said detachable cover plate, and said body portion being further provided at an outer periphery thereof with a slide contact portion which is tightly fitted to the roller abutment surface of said outer member, each of the roller-retaining grooves being formed to have an arcuate surface for receiving said opposite sides of the peripheral surface of the roller.

6. The mechanism according to claim 5, wherein each said roller is formed into a cylindrical shape and said arcuate surface of the roller-retaining groove has a radius of curvature larger than a radius of the peripheral surface of the roller.

7. The mechanism according to claim 6, wherein a corner defined between the roller abutment surface of the outer member and the peripheral surface of the roller-retaining groove has an obtuse angle.

* * * * *

UNITED STATES PATENT AND TRADEMARK OFFICE
CERTIFICATE OF CORRECTION

PATENT NO. : 5,178,250
DATED : January 12, 1993
INVENTOR(S) : Ashikawa et al.

It is certified that error appears in the above-indentified patent and that said Letters Patent is hereby corrected as shown below:

Column 10, line 1, delete "outer members" and insert -- gear --.

In the Abstract:

Line 10, after "tween" delete --"the"--.

Signed and Sealed this

Sixteenth Day of August, 1994

Attest:

Attesting Officer

BRUCE LEHMAN

Commissioner of Patents and Trademarks